United States Patent Office 3,312,746
Patented Apr. 4, 1967

3,312,746
PREPARATION OF FLUOROCHLOROBENZENES
Harold Crosbie Fielding, Northwich, England, assignor to Imperial Chemical Industries Limited, London, England, a corporation of Great Britain
No Drawing. Filed Jan. 4, 1965, Ser. No. 423,336
Claims priority, application Great Britain, Jan. 17, 1964, 2,214/64
4 Claims. (Cl. 260—650)

This invention relates to a process for making fluorochlorobenzenes particularly the para isomer of tetrafluorodichlorobenzene.

In U.S. patent application S.N. 282,597 filed May 23, 1963 we have described and claimed a process for making fluorochlorobenzenes and hexafluorobenzene comprising heating hexachlorobenzene with an alkali metal fluoride, preferably potassium fluoride, under anhydrous conditions at a temperature of at least 100° C. in a polar non-proton-donating liquid organic reaction medium that is inert towards the reactants. The process yields a mixture of fluorochlorobenzenes and hexafluorobenzenes in which the fluorochlorobenzenes consist mainly of trifluorotrichlorobenzene isomers, tetrafluorodichlorobenzene isomers and pentafluorochlorobenzene. In this group most of the tetrafluorodichlorobenzene is the meta isomer, and hardly any of the para isomer is formed. A typical distribution is 80% or more by weight of the meta isomer 1,3-dichlorotetrafluorobenzene, 20% or less of the ortho isomer 1,2-dichlorotetrafluorobenzene, and only 1 to 2% of the para isomer 1,4-dichlorotetrafluorobenzene. The reason for this is that in further fluorination of the tetrafluorodichlorobenzenes to give pentafluorobenzene and hexafluorobenzene the para isomer reacts the most readily with potassium fluoride, the ortho isomer much less readily, whereas the meta isomer is the least reactive.

We have now found how to replace one of the fluorine atoms in pentafluorochlorobenzene by chlorine to yield a mixture of tetrafluorodichlorobenzenes in which the para isomer predominates.

According to our invention we provide a process for making 1,4-dichlorotetrafluorobenzene comprising heating under anhydrous conditions pentafluorochlorobenzene with sodium chloride or potassium chloride in a polar non-proton-donating liquid organic reaction medium that is inert towards the reactants, separating from the reaction products the fraction containing the dichlorotetrafluorobenzenes and from said fraction separating 1,4-dichlorotetrafluorobenzene.

The lower useful temperature for the reaction is about 100° C.; the upper temperature limit depends on the thermal stability of the reaction medium and is generally not higher than 275° C. A convenient range is 200°–250° C.

Suitable reaction media include tetramethylene sulphone, dimethylene sulphone, dimethyl formamide, dimethyl acetamide, N-formyl piperidine and N-methyl 2-pyrollidone, of which tetramethylene sulphone is particularly effective. It is advantageous to use as large a proportion as possible of the reaction medium. Within the preferred reaction temperature range of 200°–250° C. the solubility of pentafluorochlorobenzene in for example tetramethylene sulphone is not more than about 5 g. per 100 mls. consequently the more of the medium there is present the more pentafluorochlorobenzene there will be available in the system as a whole for reaction with the sodium chloride.

Of the two alkali metal chlorides sodium chloride is preferred since the reaction with potassium chloride is considerably slower than it is with sodium chloride. In either case it is important that the salt is carefully dried before use. Likewise the reaction medium should be thoroughly dried beforehand for example by distillation. The alkali metal chloride may if desired be finely ground before use.

To improve the contact of the pentafluorochlorobenzene with the components of the reaction system it is advantageous to arrange for volatile materials that escape from the reaction environment to be condensed and re-introduced into the liquid reaction system at a point below the surface. The reason for this may be understood by realising that the boiling point of pentafluorochlorobenzene, 115° C. at atmospheric pressure, is below the temperature at which the chlorination reaction takes place in a reasonable time. If escaping pentafluorochlorobenzene were condensed and allowed to fall back into the reaction system by simple reflux it would quickly boil away again from the surface, and contact with the sodium chloride in the body of the reaction medium would be poor.

Separation of the para isomer from the mixture of tetrafluorodichlorobenzenes obtained by fractionation of the reaction products is readily achieved by filtration since the para isomer is a crystalline solid melting at 52–53° C. and the ortho and meta isomers are liquids at room temperature.

1,4-dichlorotetrafluorobenzene is a useful starting point for the preparation of aromatic fluorine compounds. For example when reacted with cuprous cyanide in dimethylformamide as medium tetrafluoroterephthalonitrile is obtained; this on hydrolysis yields tetrafluoroterephthalic acid which is a useful polymer intermediate.

The invention is illustrated by the following examples.

*Example 1*

70 g. of pentafluorochlorobenzene was added to a stirred reaction vessel containing 900 mls. of anhydrous tetramethylene sulphone and 200 g. of anhydrous sodium chloride. This reaction mixture was then heated to 220° C. and any pentafluorochlorobenzene leaving the reaction environment was condensed and fed back into the reaction system at a point below the surface by means of a dip-pipe. During 12 hours the temperature of the reaction mixture rose gradually to 230° C. at which point a further 8 g. of pentafluorochlorobenzene was added and the temperature restored to 220° C. This procedure was repeated at 12-hourly intervals until the reaction had run for 72 hours by which time a total of 118 g. of pentafluorochlorobenzene had been added.

Distillation and fractionation of the products yielded 50 g. of unchanged pentafluorochlorobenzene, 35 g. of tetrafluorodichlorobenzenes and 5 g. of trifluorotrichlorobenzenes. Filtration of the tetrafluorodichlorobenzenes yielded 26 g. of the para isomer 1,4-dichlorotetrafluorobenzene having a melting point of 52° C.

*Example 2*

80 g. of pentafluorochlorobenzene was added to a stirred reaction vessel containing 900 mls. of dry N-methyl-2-pyrollidone and 180 g. of dry sodium chloride. The reaction mixture was heated to 200° C. and stirred and any pentafluorochlorobenzene leaving the reaction environment was returned to it as described in Example 1. Whenever the reaction temperature rose to 205° C. more pentafluorochlorobenzene was added to bring the temperature back to 200° C. In this way the reaction was carried on for 72 hours over which a total of 102 g. of pentafluorochlorobenzene had been added. Distillation and fractionation gave 55 g. of unchanged pentafluorochlorobenzene, 16 g. of tetrafluorodichlorobenzenes and 1 g. of trifluorotrichlorobenzenes. Filtration of the mixed tetrafluorodichlorobenzenes gave 10 g. of the para isomer 1,4-dichlorotetrafluorobenzene having a melting point of 52° C.

Example 3

330 g. of pentafluorochlorobenzene was added to a stirred reaction vessel containing 6000 mls. dry tetramethylene sulphone and 1200 g. dry sodium chloride. The reaction mixture was heated to 220° C. and carried on as described in Example 1 for 72 hours over which period a total of 500 g. of pentafluorochlorobenzene was added. Distillation and fractionation followed by filtration of the tetrafluorodichlorobenzenes yielded 140 g. of the para isomer 1,4-dichlorotetrafluorobenzene (NMR analysis showed >98% para isomer). A further 25 g. of the para isomer was present dissolved in the mixture of the liquid ortho and meta isomers.

What we claim is:

1. A process for making 1,4-dichlorotetrafluorobenzene comprising heating under anhydrous conditions pentafluorochlorobenzene with an alkali metal chloride chosen from sodium chloride and potassium chloride in a polar non-proton-donating liquid organic reaction medium that is inert towards the reactants and is selected from the group consisting of tetramethylene sulphone, dimethylformamide and N-methyl-2-pyrollidone, separating from the reaction products the fraction containing the dichlorotetrafluorobenzenes and from said fraction separating 1,4-dichlorotetrafluorobenzene.

2. A process as claimed in claim 1 in which the temperature is from 100° C. to 275° C.

3. A process as claimed in claim 2 in which pentafluorochlorobenzene is heated with sodium chloride in tetramethylene sulphone as reaction medium at 200° C.–250° C.

4. A process as claimed in claim 3 in which during the heating any volatile materials that escape from the reaction system are condensed and re-introduced into the liquid reaction mixture at a point below the surface of the latter.

No references cited.

LEON ZITVER, *Primary Examiner.*

N. J. KING, *Assistant Examiner.*